United States Patent
Krupkin et al.

(10) Patent No.: US 7,663,791 B2
(45) Date of Patent: Feb. 16, 2010

(54) ROTARY WEDGE SCANNER

(75) Inventors: Vladimir Krupkin, Rishon LeZion (IL); Naftaly Shcheranski, Rehovot (IL); Boaz Lubashitz, Rehovot (IL)

(73) Assignee: ELOP Electro-Optics Industries Ltd., Rehovot (IL)

( * ) Notice: Subject to any disclaimer, the term of this patent is extended or adjusted under 35 U.S.C. 154(b) by 459 days.

(21) Appl. No.: 10/556,814

(22) PCT Filed: May 6, 2004

(86) PCT No.: PCT/IL2004/000383
§ 371 (c)(1),
(2), (4) Date: Oct. 18, 2006

(87) PCT Pub. No.: WO2004/099850
PCT Pub. Date: Nov. 18, 2004

(65) Prior Publication Data
US 2007/0041018 A1    Feb. 22, 2007

(30) Foreign Application Priority Data
May 12, 2003    (IL) .................................... 155860

(51) Int. Cl.
*G02B 26/08* (2006.01)

(52) U.S. Cl. ............... 359/211.2; 359/211.3; 359/211.5; 359/221.2

(58) Field of Classification Search .... 359/211.1–211.6
See application file for complete search history.

(56) References Cited

U.S. PATENT DOCUMENTS

| 4,118,109 A | 10/1978 | Crawford et al. |
| 4,407,464 A | 10/1983 | Linick |
| 5,321,259 A * | 6/1994 | Morgan ...................... 250/236 |

FOREIGN PATENT DOCUMENTS

| EP | 0 633 541 | 1/1995 |
| GB | 317469 | 1/1931 |
| JP | 2000 168698 | 6/2000 |

* cited by examiner

*Primary Examiner*—James Phan
(74) *Attorney, Agent, or Firm*—Oblon, Spivak, McClelland, Maier & Neustadt, L.L.P.

(57) ABSTRACT

A scanning system, including a main housing, and at least one optical wedge (12) rotatable about a shaft means (40) located within the main housing (26), wherein a laser beam having an optical axis and incident on the optical wedge (12), is refracted at least once by the wedge; characterized in that the shaft means (40) passes through the center of the at least one wedge (12) and that the optical axis of the incident laser beam is substantially parallel to, but laterally offset from, the shaft means (40).

10 Claims, 5 Drawing Sheets

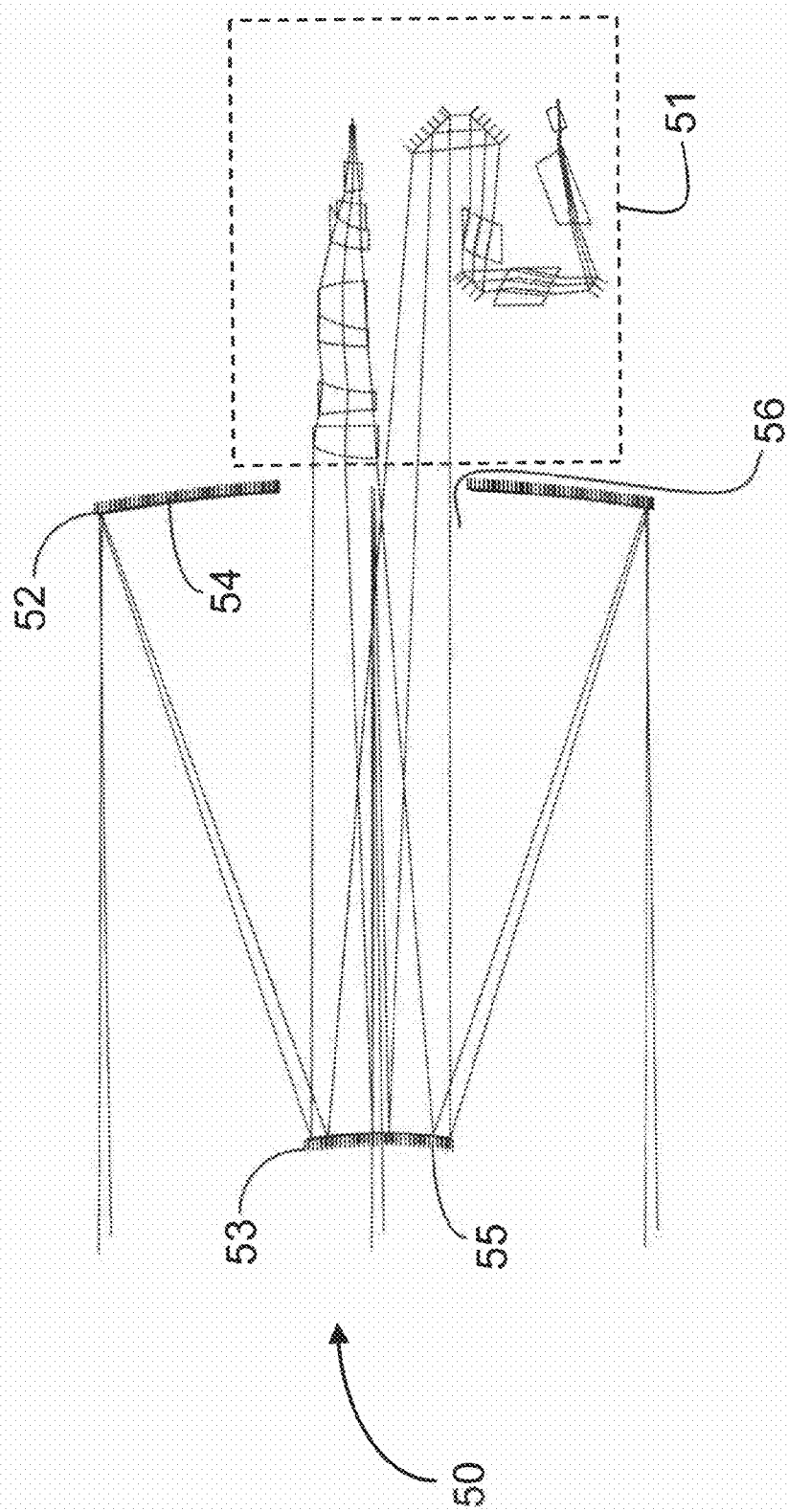

ROTARY WEDGE SCANNER

FIELD OF THE INVENTION

The present invention relates to a rotary wedge-type scanner, more particularly, to a wedge-type scanner having an optical axis that is laterally offset relative to its mechanical axis.

BACKGROUND OF THE INVENTION

Scanners are used in electro-optical devices for target acquisition, obstacle warning systems, range measurement, 3-dimensional profiling, and the like, with the object, e.g., in target acquisition, being "painted" by the controlled laser scanning beam. The laser light reflected from the object is received by the detector section of the device and, after processing, produces a real-time image of the object.

Known solutions for scanning include electro-optical or acousto-optical crystals, the index of refraction of which, and therefore the deflection of the laser beam, can be altered by changing the voltage, respectively the mechanical pressure applied. This solution, however, is useful only for very small apertures and requires complex electronics.

Also known is the use of mirrors. By rotating two mirrors simultaneously, it is possible to produce a scanning effect. Yet with increasing optical aperture, attainable speeds and accuracy are reduced. Also, when large apertures are required, mirror-type scanners need a large space for two mirrors that rotate in planes perpendicular or parallel to one another. Furthermore, mirrors are very sensitive to environmental conditions in terms of vibrations and temperature fluctuations.

Rotating wedges are the best solution for fast wide angle scanning and medium-to-large apertures. Scanning by a pair of optical wedges facilitates a design that is not only compact, but, in principle, is also nearly insensitive to environmental conditions. However, the classic wedge-type scanners suffer from serious drawbacks. The optical wedges are mounted in, or bonded to, annular metal mounts which are then press-fitted into the inside diameter of the internal race of large, peripheral bearings. The outer races of the bearings are then pressed into the inside diameter of the main housing of the device.

With increasing optical aperture, the above-described design becomes very heavy and loses its compactness. Large mounts and bearings have large moments of inertia, slowing down scanner responses. A more serious problem, however, resides in the fact that with increasing bearing diameter, the friction moment of the bearing increases exponentially. The relation between the friction moment and bearing diameter is approximately as follows:

$$M = f(D^2)$$

wherein:

M=friction moment, and

D=bearing diameter.

With larger bearing diameters, the friction moment becomes the principal moment in the system, requiring larger motors that consume more power and produce more heat to be dissipated. A larger torque also demands heavier gear transmissions. Altogether, larger torque demands not only reduce the service life of the system, but also make control of the wedges more difficult, especially when oscillating movement is required, as well as impairing the reading accuracy of the wedge position.

DISCLOSURE OF THE INVENTION

It is thus one of the objects of the present invention to overcome the drawbacks and disadvantages of the known rotary wedge scanners and to provide a scanner that, for a given transmission aperture and angle of deflection, has the lowest possible weight and power consumption and is as compact as possible so as to reduce space requirements.

It is a further object of the invention to provide a scanner that is capable of operating at high speeds and high accelerations to ensure full flexibility in scanning at a reduced sensitivity to environmental conditions, that does not demand excessive manufacturing tolerances, and in which the friction moment of the bearings, as well as the moment of inertia of the set of rotating components, are both of a minimal value.

According to the present invention, the above objects are achieved by a scanning system, comprising a main housing, and at least one optical wedge rotatable about a shaft means located within said main housing; wherein a laser beam having an optical axis and incident on said optical wedge, is refracted at least once by said wedge; characterized in that said shaft means passes through the center of said at least one wedge and that the optical axis of said incident laser beam is substantially parallel to, but laterally offset from, said shaft means.

BRIEF DESCRIPTION OF THE DRAWINGS

The invention will now be described in connection with certain preferred embodiments and with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic illustration of the scanner according to the present invention, in a first extreme position of beam deflection;

Figure 2:
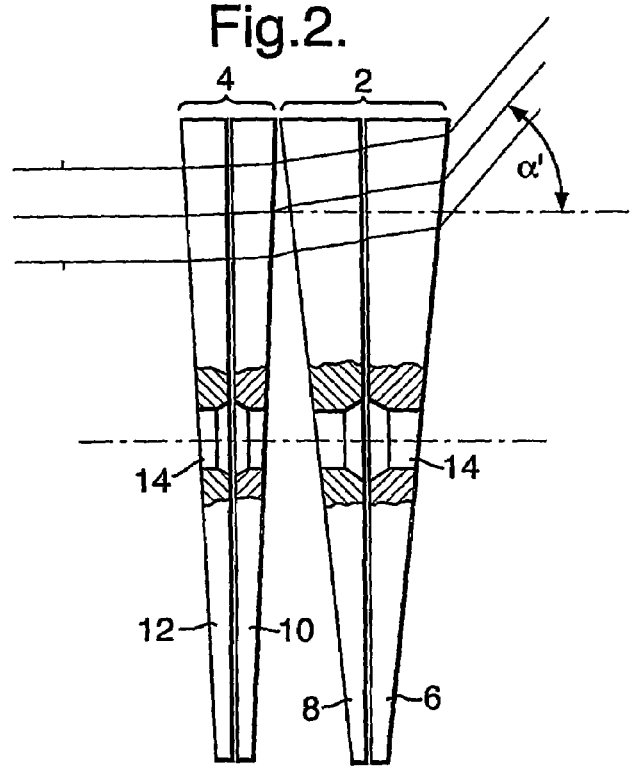
Figure 3:
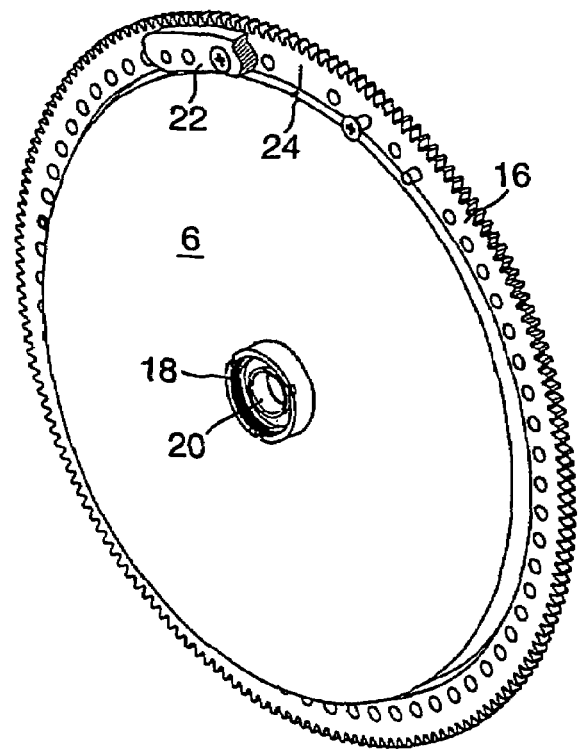
Figure 4:
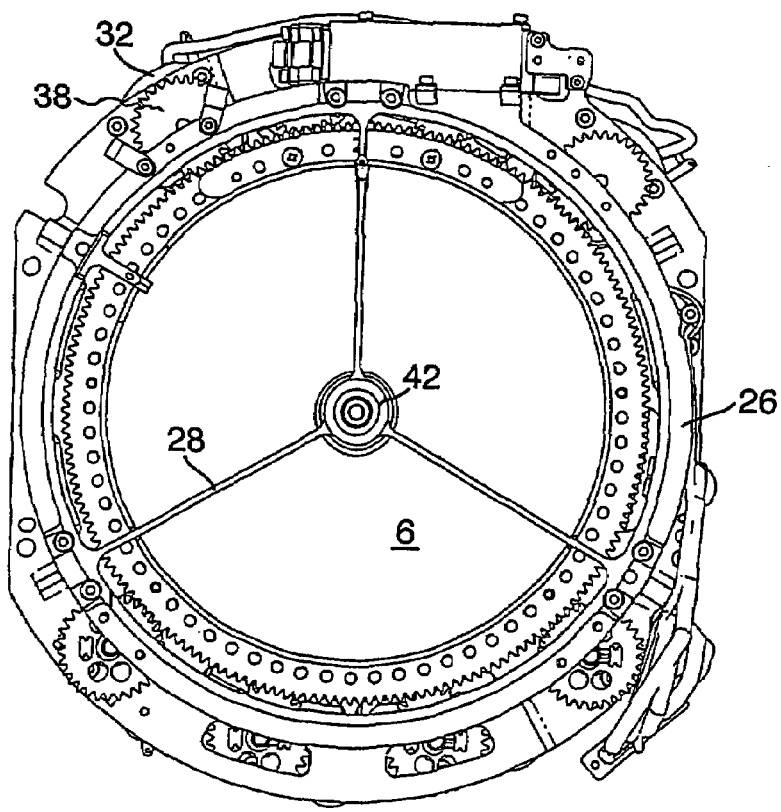
Figure 6:
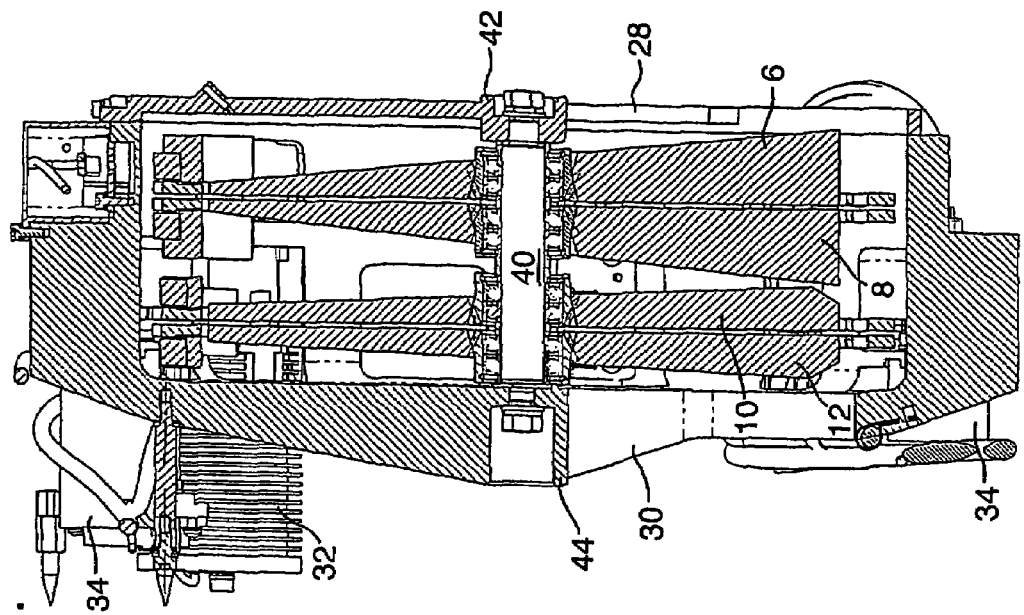
Figure 5:
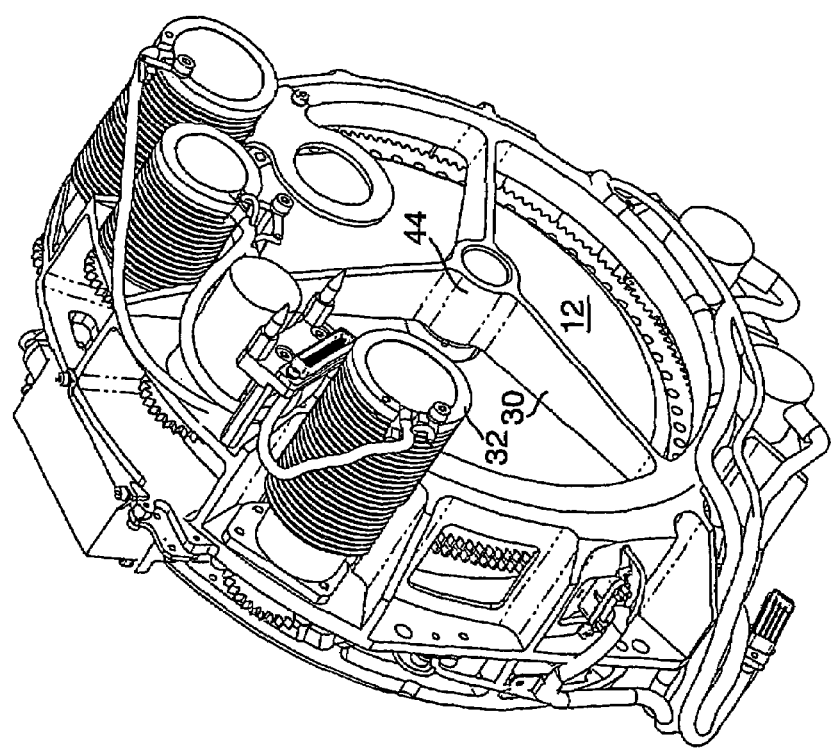
Figure 7:
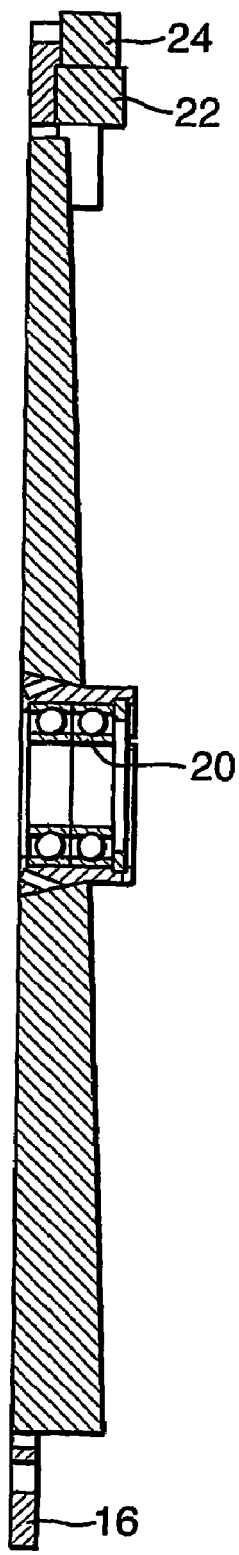
Figure 8:
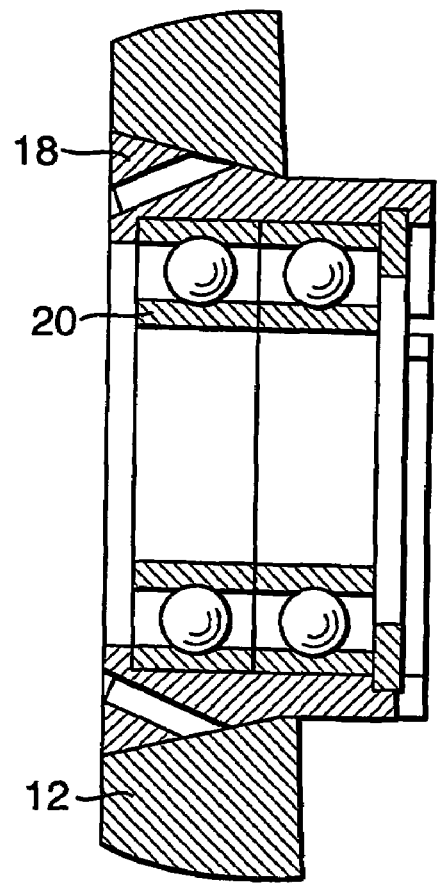

FIG. 2 schematically illustrates a second extreme position of beam deflection;

FIG. 3 is a perspective view of one of the optical wedges, including the annular gear;

FIG. 4 is a front view of the scanner assembly;

FIG. 5 is a perspective rear view of the assembly;

FIG. 6 is a cross-sectional view of the scanner of FIG. 4;

FIG. 7 represents a cross-sectional view of wedges, including the annular gear and the bearing assembly;

FIG. 8 is an enlarged cross-sectional view of the bearing assembly; and

FIG. 9 is a ray diagram showing schematically a Cassegrain optical system located in front of a scanning system.

DETAILED DESCRIPTION

Figure 1:
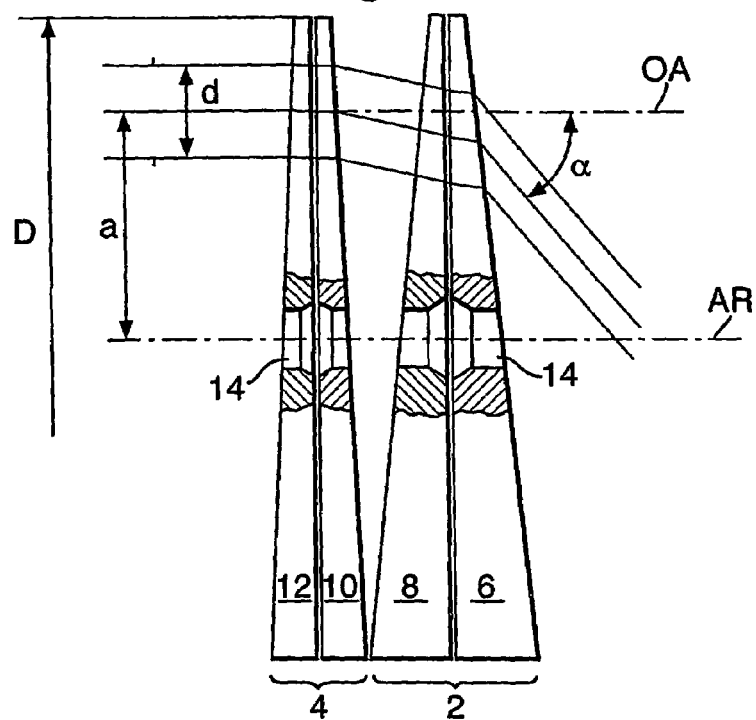

Referring now to the drawings, there are seen in FIG. 1 two pairs of optical wedges, a front pair of optical wedges 2 comprising two identical wedges and a rear pair of optical wedges 4, also comprising two identical wedges. Wedges 6, 8, 10 and 12 of the two pairs are advantageously made of silicon, because of its relatively high index of refraction. In the illustrated embodiment of the invention, the apex angle of wedges 6 and 8 is 5.9° and the apex angle of wedges 10 and 12 is 2.6°. Other apex angles are possible, as well as other high index of refraction optical materials besides silicon.

One of the principal differences between the prior-art wedge scanners and that of the present invention resides in the fact that in the former, the bearings that permit the wedges to rotate are large, peripheral ones, the disadvantages of which have already been discussed above, while the wedges of the scanner of the present invention rotate about small, central bearings. Accordingly, while in prior-art wedge scanners the optical axis and the axis of rotation are collinear, in the present invention the optical axis OA is laterally offset from the axis of rotation AR, which, obviously, passes through the center of the wedges. In the present embodiment of the invention, the lateral offset is 55 mm, with the outside diameter D of the wedges being 150 mm.

The off-center entrance beam has a diameter d of about 25 mm, and the maximal downward deflection represented in FIG. 1 is $\alpha=50°$. FIG. 2 represents the wedge positions producing the maximal upward deflection, which is $\alpha'=50°$. Accordingly the total angle of scanning is. $\alpha+\alpha'=100°$. The laser beam is transmitted through the off-axis aperture without obscuration losses.

Clearly, the central area of the scanner, being occupied by the bearings and their housings, cannot be used for the reception of the reflected beams, and reduces the clear aperture by about 18%. However, this reduction is not significant and can be compensated for by increasing the effective diameter of the wedges by about 10%.

Another embodiment envisaged employs a Cassegrain optical system located in front of the scanning system, instead of using a full aperture optical system. The loss of the central receiving area is less meaningful, because in a Cassegrain optical system light does not pass through the center area.

FIG. 9 is a ray diagram showing schematically such an embodiment comprising a Cassegrain optical system 50 located in front of a scanning system 51 according to the invention. As is well-known, the Cassegrain system 50 includes a front mirror 52 and a rear mirror 53 having respective reflecting mutually facing surfaces, shown as 54 and 55, respectively. The front mirror has a central aperture 56. The Cassegrain system 50 is located in front of the scanning system 51 such that light striking the surface 54 of the front mirror 52 is reflected thereby toward the rear mirror 53 and is reflected by the surface 55 thereof through the aperture 56 of the front mirror toward the scanning system. A central area of the scanner containing the bearing housing and the bearings is aligned with the aperture. No light is reflected through the aperture 56 of the Cassegrain system 50 but this does not unduly derogate from its performance since, in any case, light projected toward the central area of the scanner would be wasted owing to the presence of the bearing housing and the bearings.

The four wedges 6, 8, 10 and 12 can be driven and controlled separately and independently with respect to all magnitudes such as velocity, angular position, acceleration, sense of rotation, scanning pattern and others, by electronic means, using angular sensors and feedback processing. Electronic control is very versatile and allows the change of interrelations of the above magnitudes and of the scan pattern without modifying the mechanical design of the device, thus permitting the same device to serve many applications and furthermore facilitating a change of scan patterns in real time. Also possible is non-patterned 2D and 3D scanning.

The preferred scan pattern is the so-called rosette, having different vertical and horizontal dimensions. Of particular usefulness is a scan pattern wider in the horizontal direction, with the rotation axis being in the horizontal plane. Other combinations allow linear scans, including scans in the vertical plane only.

Wedge 12 rotates fast, providing a high linear scan speed. Wedge 10 rotates slowly, with wedge 12 malting several tens of turns for one turn of wedge 10. Both the angular phase difference and the ratio of angular speeds are pre-definable. The rate of rotation of wedge 10 is designated as frame rate. Wedges 8 and 6 rotate in opposite directions, providing deflection in the horizontal direction, versus no deflection in the vertical direction. The rate of rotation of wedges 8 and 6 equals the frame rate. The initial angular phases of wedges 10, 8 and 6 are identical, which means that the scanner provides maximum deflection in the horizontal direction when wedge 10 deflects to the left or right.

Wedges 8 and 6 could also provide full turns for maximum width of the scan pattern, while scan patterns of any desired width can be provided by performing partial turns of these wedges, by oscillating them about their central (vertical) positions. For example, the turn rates of wedges 12, 10, 8 and 6 could be 30, 1, 1 and −1 turns per second, respectively. Different patterns can be produced by different turn-rate combinations, while pattern orientation can be changed by changing the phase differences of wedges 10, 8 and 6.

The scanner transmits light in both directions, with most of the aperture being used to collect the reflected light into the receiver channel. For the same optics, the transmitting and receiving channels have the same deflection characteristic for the same wavelength, which, in the present embodiment, is 1.5 µm. To obtain identical deflection characteristics also for several different wavelengths, achromatic wedges must be used.

FIG. 3 shows a subassembly including a wedge, e.g., wedge 6, annular spur gear 16, bearing housing 18, double ball bearing 20, balancing weight 22 and an index.

Annular gear 16, of which there is one for each wedge, is made of aluminum and is bonded to the periphery of its wedge, which therefore defines the position of the gear with respect to the main housing. As the difference of thermal expansion between the silicon of the wedge and the aluminum of gear 16 is rather large, allowance is made for this difference by using a special adhesive of a calculated layer thickness that is compressed with rising ambient temperature and re-expands with falling temperature. Each wedge has a bearing housing 18, seen to better advantage in FIG. 8, which confronts a similar problem, discussed further below in conjunction with FIG. 8.

Each wedge also has two ball bearings mounted in bearing housing 18, seen to better advantage in FIG. 8.

As the center of gravity of the optical wedges is obviously not located along the mechanical axis AR (FIG. 1), a balancing weight 22 must be provided to move the center of gravity exactly into that axis, to prevent destructive vibrations. By carefully shifting weight 22 along annular gear 16, a position can be found in which the subassembly is dynamically balanced.

Index 24 is used in conjunction with the rotary encoders discussed further below.

FIGS. 4 and 5 are views of the front and rear faces, respectively, of the assembled scanner. Seen is a main housing 26 that, because of the above-mentioned low friction moment, can be made of an aluminum casting instead of a steel one, thereby reducing the total weight of the device by 650 gr. The assembled wedges 6, 8, 10 and 12 are attached to main housing 26 by a first three-armed spider 28 seated on and supporting bearing housing 18 of wedge 6 and a second three-armed spider 30 seated on and supporting bearing housing 18 of wedge 12.

Further seen are high-precision drive motors 32, one for each wedge, and shaft encoders 34, also one for each wedge. Both drive motors 32 and shaft encoders 34 are separately mounted on main housing 26.

Shaft encoders 34 must measure wedge position with a high degree of accuracy, therefore their gears 36, which engage with annular gears 16, must be equipped with anti-backlash mechanisms. Drive-motor gears 38, on the other hand, may have some backlash in their engagement with annular gears 16, without interfering with the proper operation of the scanner.

In the cross-sectional view of FIG. 6, there is seen a central shaft 40 which passes through all of the wedges and about which all of the ball bearings 20 rotate, each wedge having two bearings mounted in its bearing housing 18 (also see FIG. 8). Central shaft 40 has two threaded ends of reduced diameter that fit into recesses in the hubs 42, 44 of spiders 28, 30.

FIG. 7 shows a wedge including its annular gear 16 and bearing assembly comprising bearing housing 18 and ball bearings 20.

FIG. 8 represents the central portion of FIG. 7, at an enlarged scale. Here, at the bearing housing/wedge interface, another differential-expansion problem must be dealt with, as the coefficient of expansion of the silicon wedge is about $2 \times 10^{-6} 1/C°$, while the coefficient of expansion of the bearing housing is about $7 \times 10^{-6} 1/C°$. To prevent potentially destructive stresses from developing, bore 14 in the wedges is partly tapering, as is clearly shown in FIG. 8. A special adhesive, of a calculated layer thickness, is used for joining the wedges and their bearing housings 18. The tapering section of bore 14 facilitates a slight axial movement of the wedges relative to the bearing housings 18, thereby rendering the radial forces created by expansion differences innocuous. The coaxiality between annular gear 16 and bearing housing 18 has to be as perfect as possible.

While power transmission in the present embodiment was designed as a gear transmission, power from motors 32 to the wedges could also take the form of belt drives.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes, which come within the meaning and range of equivalency of the claims, are therefore intended to be embraced therein.

What is claimed is:

1. A scanning system, comprising:
   a main housing;
   at least one optical wedge rotatable about a shaft means located within said main housing, wherein a laser beam having an optical axis and incident on said optical wedge is refracted at least once by said at least one wedge, said shaft means passes through the center of said at least one wedge, and the optical axis of said incident laser beam is substantially parallel to, but laterally offset from, said shaft means;
   bearings accommodated in a bore of said at least one optical wedge, the bore being concentric about said shaft means;
   power transmission means for rotating said at least one optical wedge about said shaft means; and
   spider means for attaching said at least one optical wedge to the main housing.

2. The scanning system, as claimed in claim 1, comprising:
   a first pair of rotatable optical wedges and a second pair of rotatable optical wedges, said first and second pairs of wedges being rotatable about a common central axis;
   encoder means drivable by said optical wedges for determining the instantaneous angular positions of said wedges, and
   a laser beam source,
   wherein a laser beam incident on the surface of the optical wedge closest to said source undergoes multiple refractions.

3. The scanning system as claimed in claim 1, wherein said power transmission means is an annular gear fixedly attached to a periphery of said at least one optical wedge.

4. The scanning system as claimed in claim 1, further comprising motor means fixedly attached to said main housing in engagement with said power transmission means, for rotating said at least one optical wedge.

5. The scanning system as claimed in claim 4, wherein power from said motor means is transmitted to said at least one optical wedge by a drive belt.

6. The scanning system as claimed in claim 4, wherein said power transmission means is an annular gear fixedly attached to a periphery of said at least one optical wedge and said motor means is at least indirectly engageable with said annular gear.

7. The scanning system as claimed in claim 4, wherein said motor means drives said at least one optical wedge independently and separately from another optical wedge.

8. The scanning system as claimed in claim 1, wherein said bore of said at least one optical wedge is an at least partly tapering bore.

9. The scanning system as claimed in claim 8, further comprising a bearing housing within said bore, said bearing housing including an at least partly tapering surface fitting said at least partly tapering bore, wherein said bearing housing is joined to said at least one optical wedge by an adhesive of a predetermined layer thickness, said adhesive permitting radial forces apt to be created due to differences in the thermal expansion of said at least one optical wedge and said bearing housing to be compensated for by an axial displacement of said at least one optical wedge relative to said bearing housing.

10. An optical system, comprising:
    the scanning system as claimed in claim 1;
    a Cassegrain system including a front mirror and a rear mirror having respective reflecting mutually facing surfaces, said front mirror having a central aperture, said Cassegrain system being located in front of the scanning system such that light striking the front mirror is reflected thereby toward the rear mirror and is reflected by the rear mirror through the central aperture of the front mirror toward the scanning system; and
    a central area of the scanner containing the bearings of the scanning system being aligned with the central aperture.

* * * * *